United States Patent
Wang et al.

(10) Patent No.: US 10,502,996 B2
(45) Date of Patent: Dec. 10, 2019

(54) DISPLAY MOTHERBOARD AND METHOD OF CUTTING THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Zhuo Wang, Beijing (CN); Haoyuan Fan, Beijing (CN); Wulin Shen, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/682,231

(22) Filed: Aug. 21, 2017

(65) Prior Publication Data

US 2018/0101036 A1 Apr. 12, 2018

(30) Foreign Application Priority Data

Oct. 11, 2016 (CN) .......................... 2016 1 0887781

(51) Int. Cl.
*G02F 1/1333* (2006.01)
*G02F 1/1335* (2006.01)

(52) U.S. Cl.
CPC .. *G02F 1/133351* (2013.01); *G02F 1/133345* (2013.01); *G02F 1/133512* (2013.01)

(58) Field of Classification Search
None
See application file for complete search history.

(56) References Cited

U.S. PATENT DOCUMENTS

| | | | | |
|---|---|---|---|---|
| 6,577,367 B2 * | 6/2003 | Kim | ...................... | G02F 1/1309 324/760.02 |
| 7,667,798 B2 * | 2/2010 | Nakagawa | ............ | G02F 1/1339 349/106 |

(Continued)

FOREIGN PATENT DOCUMENTS

CN 103995385 A 8/2014

OTHER PUBLICATIONS

First Office Action for Chinese Application No. 201610887781.X, dated Jan. 14, 2019, 6 Pages.

*Primary Examiner* — Richard H Kim
(74) *Attorney, Agent, or Firm* — Brooks Kushman P.C.

(57) ABSTRACT

A display motherboard and a method of cutting the same are provided, which relate to a display technology to form a display panel of narrow bezel. The display motherboard includes a plurality of display panels, each of the display panels includes a display region and a sealant arranged at a periphery of the display region, adjacent two display panels in an identical row share the sealant at a first common region, the first common region includes a light shielding region and an insulating layer, the light shielding region includes a first light shielding region and a second light shielding region, the first light shielding region is at a side of the first common region adjacent to the display region of one of the adjacent two display panels in the identical row, the second light shielding region is at a side of the first common region adjacent to the display region of the other one of the adjacent two display panels in the identical row, and the insulating layer is between the first light shielding region and the second light shielding region. The display motherboard provided by the present disclosure is configured to form a display panel.

16 Claims, 7 Drawing Sheets

(56) References Cited

U.S. PATENT DOCUMENTS

| | | | | |
|---|---|---|---|---|
| 9,104,073 B2 * | 8/2015 | Hatakeyama | .......... | G02F 1/1339 |
| 9,829,749 B2 * | 11/2017 | Kim | .................. | G02F 1/133351 |
| 2015/0327361 A1 | 11/2015 | Wang et al. | | |

* cited by examiner

DISPLAY MOTHERBOARD AND METHOD OF CUTTING THE SAME

CROSS-REFERENCE TO RELATED APPLICATION

This application claims priority to Chinese Patent Application No. 201610887781.X filed Oct. 11, 2016, which is incorporated herein by reference in its entirety.

TECHNICAL FIELD

The present disclosure relates to the field of display technology, and in particularly to a display motherboard and a method of cutting the same.

BACKGROUND

A display panel is an important part of a display device, and the display panel is formed by cutting a display motherboard.

In the related art, the display motherboard may include a plurality of display panels, an annular sealant is arranged at a periphery of a display region of each of the display panels, and the sealant may seal the display region. When cutting the display motherboard, since an upper substrate, a lower substrate and the sealant there between in the cutting region form a solid structure, when cutting the solid structure by a mechanical cutter wheel, the mechanical cutter wheel cannot vertically permeate the solid structure completely, thus influencing a segmenting effect of the display panel in a later process, and forcibly breaking and segmenting will cause micro-cracks on the upper substrate and the lower substrate. Therefore, for the display motherboard in the related art, a certain cutting space is left between the sealants of adjacent two display panels, such that the mechanical cutter wheel may cut the display motherboard at a location corresponding to the cutting space on the display motherboard, and because of the cutting space, the mechanical cutter wheel may vertically permeate the solid structure well, thereby guaranteeing the segmenting effect of the display panel in the later process.

However, a bezel of the formed display panel may be wide in the case that the cutting space is left in the display motherboard, and thus the display panel with a narrow bezel cannot be formed, and display effect of the display panel may be adversely affected.

SUMMARY

An object of the present disclosure is to provide a display motherboard and a method of cutting the same.

The present disclosure provides the following technical solutions.

In one aspect, the present disclosure provides a display motherboard, the display motherboard includes a plurality of display panels, each of the display panels includes a display region and a sealant arranged at a periphery of the display region, adjacent two display panels in an identical row share the sealant at a first common region, the first common region includes a light shielding region and an insulating layer, the light shielding region includes a first light shielding region and a second light shielding region, the first light shielding region is at a side of the first common region adjacent to the display region of one of the adjacent two display panels in the identical row, the second light shielding region is at a side of the first common region adjacent to the display region of the other one of the adjacent two display panels in the identical row, and the insulating layer is between the first light shielding region and the second light shielding region.

In another aspect, the present disclosure provides a method of cutting the above display motherboard. The cutting method includes: etching the insulating layer by an etching process to remove the insulating layer and form a gap between the first light shielding region and the second light shielding region; and cutting the display motherboard at a position corresponding to the gap on the display motherboard.

BRIEF DESCRIPTION OF THE DRAWINGS

Drawings described herein is used to facilitate further understanding of the present disclosure and constitutes a part of the present disclosure, schematic embodiments of the present disclosure and descriptions thereof are used to explain, rather than limit inappropriately, the present disclosure. In drawings.

DRAWING REFERENCE

10—display motherboard;
101—edge region;
11—array substrate;
111—TFT layer;
12—color filter substrate;
121—base substrate;
122—color filter layer;
1221—red color filter resin;
1222—green color filter resin;
1223—blue color filter resin;
123—planarization layer;
124—spacer;
20—display panel;
21—display region;
22—sealant;
221—cutting space;

222—first common region;
223—first edge;
224—second common region;
23—electrode terminal region;
24—bezel region;
30—insulating layer;
31—gap;
41—first light shielding region;
42—second light shielding region;
50—cutting line

DETAILED DESCRIPTION

In order to make the objects, the features and the advantages of the present disclosure more apparent, embodiments of the technical solutions provided by the present disclosure will be described hereinafter in a clear and complete manner in conjunction with the drawings. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
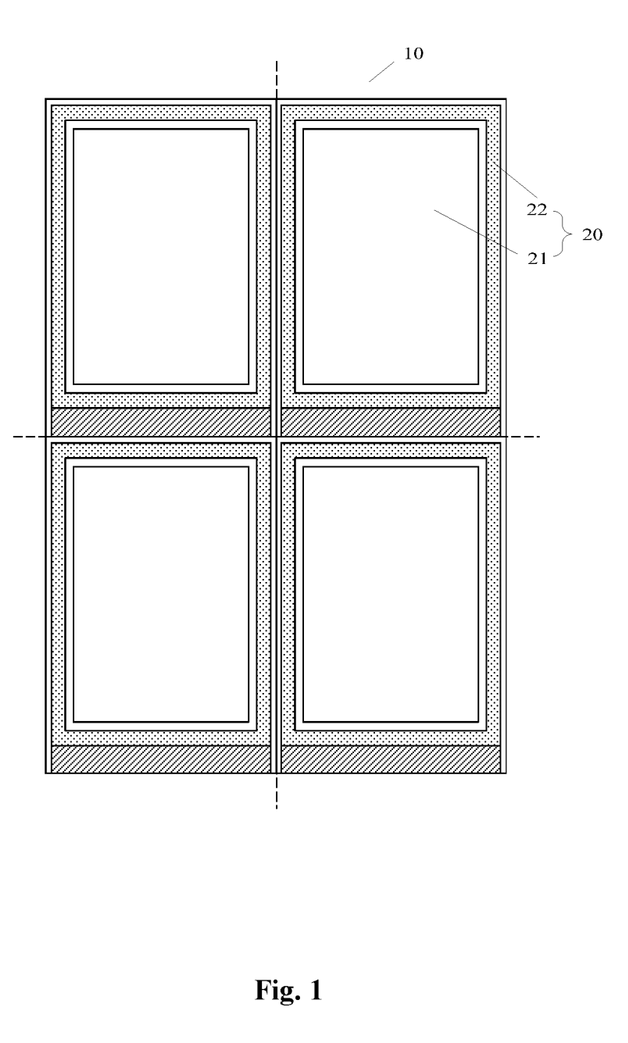
FIG. 1 is a plane view of a display motherboard in the related art.
Figure 2:
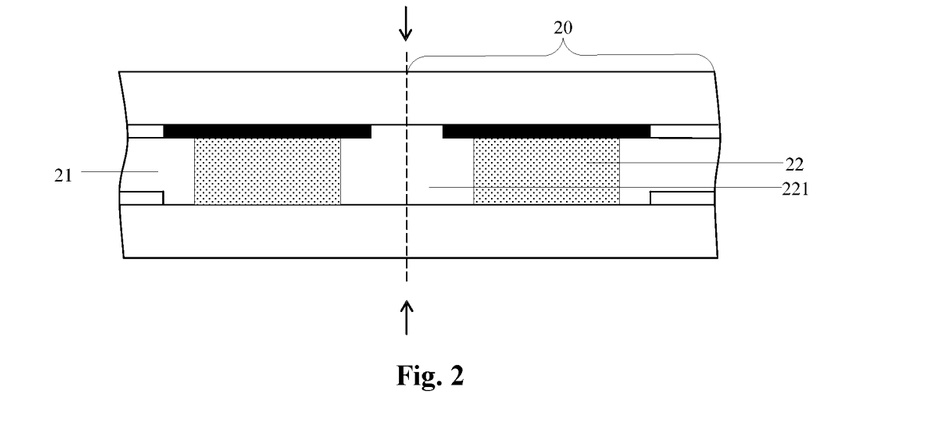
FIG. 2 is a cross-sectional view of a display motherboard in the related art.

Referring to FIG. 1 and FIG. 2, a display motherboard 10 may include a plurality of display panels 20, an annular sealant 22 is arranged at a periphery of a display region 21 of each of the display panels 20, and the sealant 22 may seal the display region 21. When cutting the display motherboard 10, since an upper substrate, a lower substrate and a sealant there between in the cutting region form a solid structure, when cutting the solid structure by a mechanical cutter wheel, the mechanical cutter wheel cannot vertically permeate the solid structure completely, thus influencing a segmenting effect of the display panel in the later process, and forcibly breaking and segmenting will cause microcracks on the upper substrate and the lower substrate. Therefore, for the display motherboard 10 in the related art, a certain cutting space 221 is left between the sealants 22 of adjacent two display panels 20, such that the mechanical cutter wheel may cut the display motherboard 10 at a location corresponding to the cutting space 221 on the display motherboard 10 (an arrowhead in drawings indicates a position corresponding to the cutting space 221), and because of the existence of the cutting space 221, the mechanical cutter wheel may vertically permeate the solid structure well, thus guaranteeing the segmenting effect of the display panel 200 in the later process.

However, a bezel of the formed display panel 20 may be wide in the case that the cutting space is left in the display motherboard, and thus the display panel 20 with a narrow bezel cannot be formed, and a display effect of the display panel 20 may be adversely affected.

Figure 3:
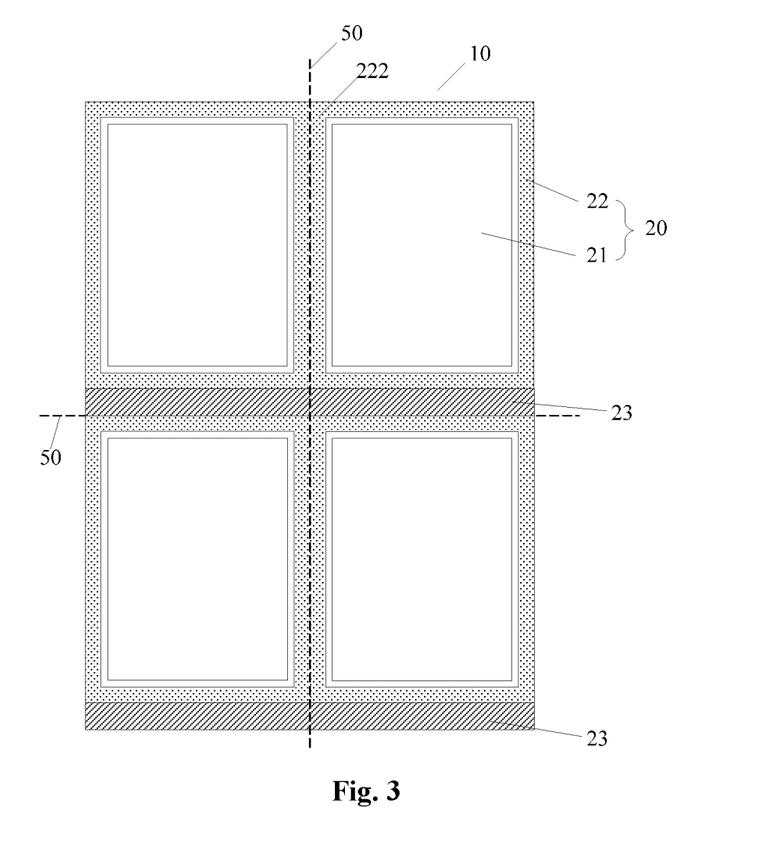
FIG. 3 is a first plane view of a display motherboard provided by the present disclosure in at least one embodiment.
Figure 4:
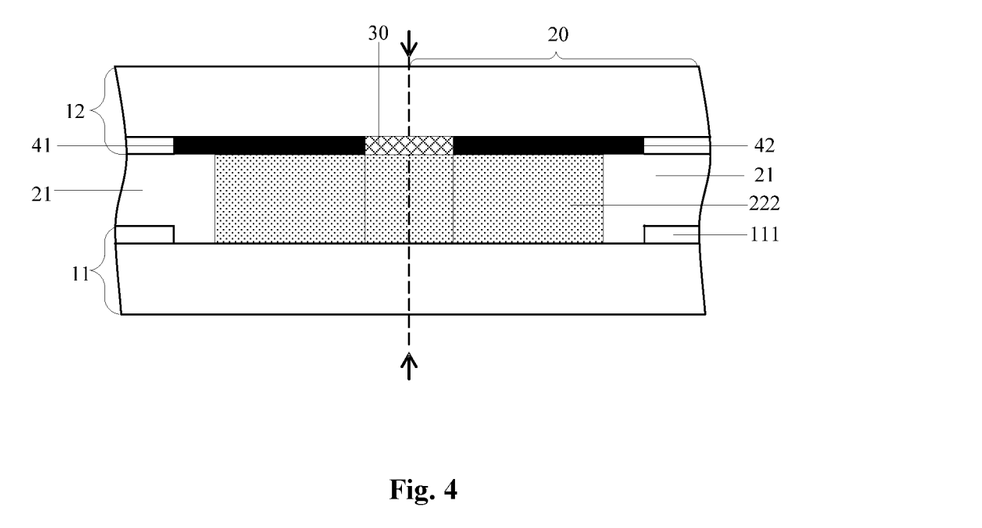
FIG. 4 is a first cross-sectional view of a display motherboard provided by the present disclosure in at least one embodiment.

Referring to FIG. 3 and FIG. 4, the present disclosure provides in at least one embodiment a display motherboard 10, the display motherboard 10 includes a plurality of display panels 20, each of the display panels 20 includes a display region 21 and a sealant 22 arranged at a periphery of the display region 21. In compared with the display motherboard 10 in the related art, a cutting space 221 is not in the display motherboard 10 in at least one embodiment of the present disclosure, instead, instead adjacent two display panels 20 in an identical row share the sealant 22 at a first common region 222, and an insulating layer 30 is arranged at a middle of the first common region 222 includes. Light shielding regions are arranged at two sides of the insulating layer 30, each includes a first light shielding region 41 and a second light shielding region 42. In other words, the first light shielding region 41 is at a side of the first common region 222 adjacent to the display region 21 of one of the adjacent two display panels 21 in the identical row, the second light shielding region 42 is at a side of the first common region 222 adjacent to the display region 21 of the other one of the adjacent two display panels 21 in the identical row, and the insulating layer 30 is between the first light shielding region 41 and the second light shielding region 42.

In the display motherboard 10 in at least one embodiment of the present disclosure, the light shielding region and the insulating layer 30 are arranged on the first common region 222, the light shielding region includes the first light shielding region 41 and the second light shielding region 42, and the insulating layer 30 is between the first light shielding region 41 and the second light shielding region 42. When cutting the above display motherboard 10, firstly the insulating layer 30 is etched by an etching process to remove the insulating layer 30 and form a gap between the first light shielding region 41 and second light shielding region 42, and then the display motherboard 10 is cut at a position corresponding to the gap on the display motherboard 10 by a mechanical cutter wheel, and then the display motherboard 10 may be segmented easily at the gap to form a plurality of display panels 20 by gently pressing the display motherboard 10. Adjacent two display panels 20 in an identical row share the sealant 22 at a first common region 222, therefore a portion of the bezel of the formed display panel 20 at the first common region 222 may be narrow, thereby narrowing the bezel of the display panel 20.

It can be seen from the above that, the sealants 22 of the display panels 20 of the display motherboard 10 in the related art are separated from each other, while the sealants 22 of the display panels 20 of the display motherboard 10 provided by the present disclosure in at least one embodiment are not completely separated from each other. Therefore, when forming the display motherboard 10 in at least one embodiment of the present disclosure, adjacent sealants 22 in an identical row may be coated together to form a first common region 222. Accordingly, the display motherboard 10 may be cut at a position corresponding to the first common region 222.

Display motherboard 10 may be divided into a plurality of sequentially arranged display panels 20. Among the plurality of sequentially arranged display panels 20, some display panels 20 are at an outermost side. In at least one embodiment of the present disclosure, a region of the display motherboard 10 adjacent to an outermost display panel 20 is called an edge region (a dummy region). For the display motherboard 10 in the related art, when separating the outermost display panel 20, generally, the display motherboard 10 is cut at a position corresponding to the edge region. However, in at least one embodiment of the present disclosure, the display motherboard 10 is cut at a position corresponding to the sealant 22, therefore a portion of the bezel of the formed display panel 20 adjacent to the edge region may be narrow, thereby further perfecting the display motherboard 10 in at least one embodiment of the present disclosure.

Figure 5:
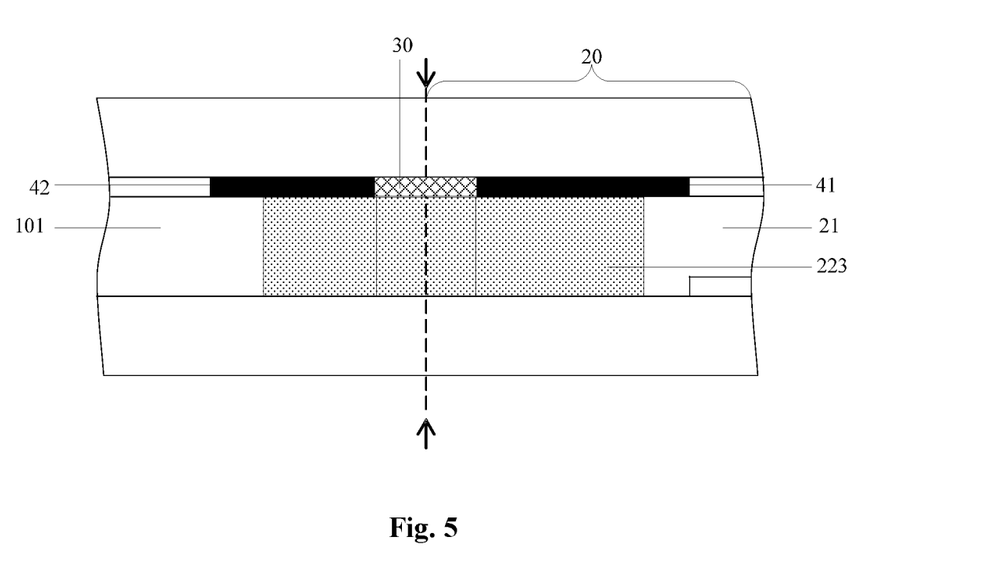
FIG. 5 is a second cross-sectional view of a display motherboard provided by the present disclosure in at least one embodiment.

Referring to FIG. 5, in order to achieve the above solution, a portion of the sealant 22 close to the edge region 101 of the display motherboard 10 is called a first edge portion 223, therefore the cutting position of the display motherboard 10 is a position corresponding to the first edge portion 223. The arrangement of the first edge portion 223 is identical to that of the first common region 222, the first edge portion 223 also includes the first light shielding region 41, the second light shielding region 42 and the insulating layer 30, and the insulating layer 30 is between the first light shielding region 41 and the second light shielding region 42. Optionally, the first light shielding region 41 is at a side of the first edge portion 223 adjacent to the display region 21, the second light shielding region 42 is at a side of the first edge portion 223 adjacent to the corresponding edge region 101; or the first light shielding region 41 is at a side of the first edge portion 223 adjacent to the corresponding edge region 101, the second light shielding region 42 is at a side of the first edge portion 223 adjacent to the corresponding display region 21. On the basis of the above display motherboard 10, when cutting the display motherboard 10, firstly the insulating layer 30 is etched by an etching process to remove the insulating layer 30 and form a gap between the first light shielding region 41 and the second light shielding region 42, and the display motherboard 10 is cut at a position corresponding to the gap by a mechanical cutter wheel, and then the display motherboard 10 may be segmented easily at the gap by gently pressing the display motherboard 10, and thus the display motherboard 10 in at least one embodiment of the present disclosure is cut at both the first common region 222 and the first edge portion 223 corresponding to the outermost display panel 20, thereby forming the display panel 20 with a narrow bezel.

Figure 6:
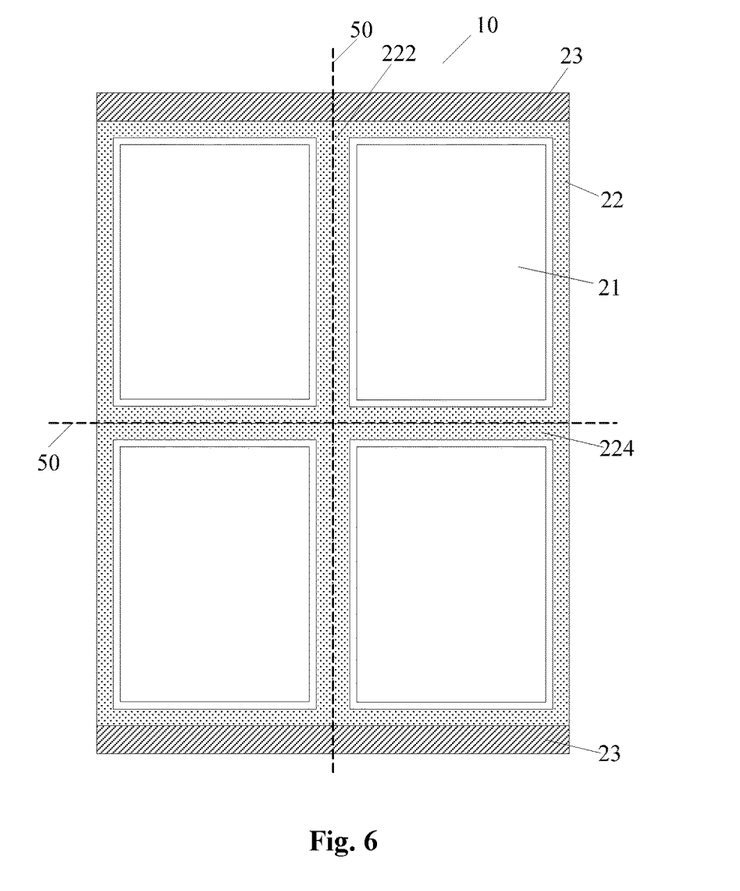
FIG. 6 is a second plane view of a display motherboard provided by the present disclosure in at least one embodiment.

Referring to FIG. 3 and FIG. 6, the display motherboard 10 may further include an electrode terminal region 23 for connecting to external lines, and there is a one-to-one correspondence between the electrode terminal region 23 and the display region 21. As a part of the display panel 20, the electrode terminal region 23 is capable of realizing a display function of the display panel 20. Optionally, the electrode terminal region 23 of the display panel 20 may be arranged at a side of the sealant 22 away from the display region 21, and the electrode terminal region 23 and first common region 222 in at least one embodiment of the present disclosure may be perpendicular to each other. Therefore, the electrode terminal region 23 of each one of the display panels 20 may be arranged at two positions, and the corresponding display motherboard 10 may be arranged in a plurality of manners. Exemplarily, the following manners may be considered.

First Manner

Referring to FIG. 3, in the display motherboard 10, the electrode terminal regions 23 of the display panels 20 in an identical row may be at an identical side of the respective display regions 21 of the display panels 20, and the electrode terminal regions 23 of the display panels 20 in an identical column may be at an identical side of the respective display regions 21 of the display panels 20, that is, in the display panels 20 in an identical column, an electrode terminal region 23 of the display panel 20 is adjacent to a display regions 21 of an adjacent display panel 20 in the identical column. Arranging in such a manner, most display panels 20 formed by the display motherboard 10 each has two narrow bezels, the two narrow bezels may be at the first common region 222 and/or correspond to the first edge portion 223. The display panel 20 at a corner of the display motherboard 10 may include three narrow bezels.

Second Manner

Referring to FIG. 6, the electrode terminal regions 23 of the display panels 20 in an identical row may be at an identical side of the respective display regions 21, and the electrode terminal regions 23 of adjacent two display panels 20 in an identical column may be at opposite sides of the respective display regions 21, that is, in display panels 20 in an identical column, one side of the electrode terminal regions 23 of one display panel 20 may be adjacent to the electrode terminal region 23 of the adjacent display panel 20 in the identical column, and the other side may be adjacent to the display region 21 of the other adjacent display panel 20 in the identical column, obviously, excepting the outermost display panel 20. Arranging in such a manner, the display panels 20 formed by the display motherboard 10 may each has three narrow bezels. Accordingly, the adjacent two display panels 20 in an identical column share the sealant 22 at a second common region 224, the arrangement of the second common region 224 is identical to that of the first common region 222, the second common region 224 may also include the first light shielding region 41, the second light shielding region 42 and the insulating layer 30 between the first light shielding region 41 and the second light shielding region 42. The first light shielding region 41 is at a side of the second common region 224 adjacent to the display region 21 of one of the adjacent two display panels in the identical column, the second light shielding region 42 is at a side of the second common region 224 adjacent to the display region 21 of the other one of the adjacent two display panels in the identical column. A segmenting principle of two display panels 20 in an identical column at the second common region 224 is identical to that of two display panels 20 in an identical row at the first common region 222, and the detailed description thereof is omitted herein. Therefore, the three narrow bezels of the display panel 20 are respectively a bezel corresponding to the first common region 222 and/or a bezel corresponding to the first edge portion 223 and a bezel corresponding to the second common region 224.

Referring to FIG. 4, optionally, the display motherboard 10 in at least one embodiment of the present disclosure may include an array substrate 11 and a color filter substrate 12, the array substrate 11 and the color filter substrate 12 both includes an inner surface and an outer surface, the inner surface of the array substrate 11 and the inner surface of the color filter substrate 12 are arranged in parallel, the sealant 22 is between the inner surface of the array substrate 11 and the inner surface of the color filter substrate 12, the light shielding region and the insulating layer 30 are at a region in the color filter substrate 12 corresponding to the first common region 222 and/or the first edge portion 223 and/or the second common region 224 in, such that the light shielding region and the insulating layer 30 may shield the corresponding portion of the sealant 22.

Figure 7:
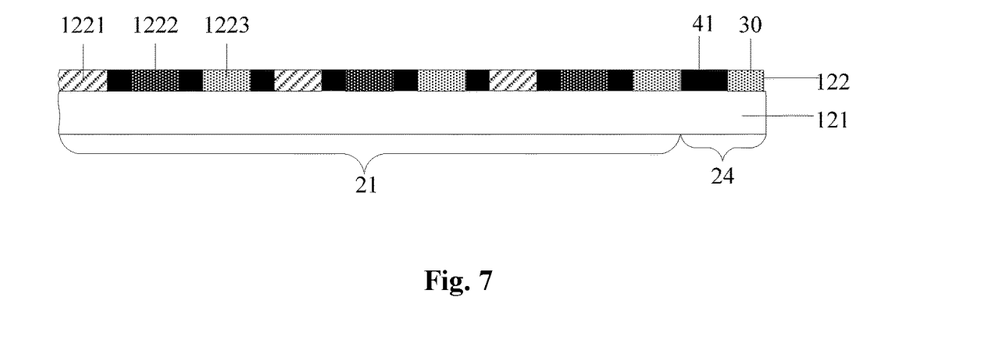
FIG. 7 is a first cross-sectional view of a color filter substrate provided by the present disclosure in at least one embodiment.

Referring to FIG. 7, it should be noted that, the display panel 20 includes a display region 21 and a bezel region 24 arranged at a periphery of the display region 21, and the sealant 22 is arranged at the bezel region 24. Optionally, a light shielding region may be arranged at a side of the sealant 22 adjacent to the display region 21, and the light shielding region on the sealant 22 may shield from the periphery of the display region 21, so as to ensure display effect of the display region 21.

Referring to FIG. 7, optionally, first of all, the color filter substrate 12 may include a base substrate 121, a black matrix and a color filter layer 122 that arranged in a laminated manner, the color filter layer 122 may include a red color filter resin 1221, a green color filter resin 1222 and a blue color filter resin 1223 such that the display panel 20 display a color image, and the black matrix is correspondingly arranged between the red color filter resin 1221, the green color filter resin 1222 and the blue color filter resin 1223 to play a light-shielding effect. In conjunction with the display motherboard 10 in at least one embodiment of the present disclosure, the sealant 22 is between the inner surface of the array substrate 11 and the color filter layer 122. The first light shielding region 41 and the second light shielding region 42 on the sealant 22 may both be a part of the black matrix of the present disclosure. Furthermore, the insulating layer 30 between the first light shielding region 41 and the second light shielding region 42 may also be a part of the black matrix of the present disclosure. Furthermore, the insulating layer 30 may also be arranged on the color filter layer 122, and the insulating layer 30 may be a red color filter resin 1221, a green color filter resin 1222 or a blue color filter resin 12. Therefore, when forming the display motherboard 10, the first light shielding region 41 and the second light shielding region 42 may be formed simultaneously with the black matrix of the present disclosure, and the insulating layer 30 may be formed simultaneously with the black matrix or the color filter layer 122.

Figure 8:
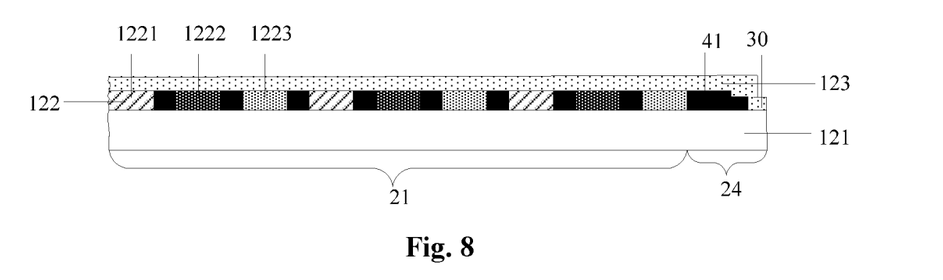
FIG. 8 is a second cross-sectional view of a color filter substrate provided by the present disclosure in at least one embodiment.

Referring to FIG. 8, furthermore, the color filter substrate 12 may further include a planarization layer 123 on the color filter layer 122, in conjunction with the display motherboard 10 in at least one embodiment of the present disclosure, the sealant 22 is between the inner surface of the array substrate 11 and the planarization layer 123, the first light shielding region 41 and the second light shielding region 42 of the sealant 22 may both be arranged in the black matrix. Optionally, the insulating layer 30 may be arranged in the planarization layer 123. Therefore, when forming the display motherboard 10, the first light shielding region 41 and the second light shielding region 42 may be formed simultaneously with the black matrix, and the insulating layer 30 may be formed simultaneously with the planarization layer 123.

Figure 9:
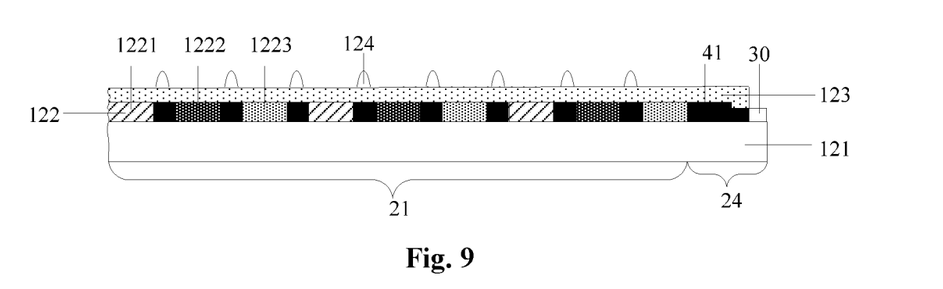
FIG. 9 is a third cross-sectional view of a color filter substrate provided by the present disclosure in at least one embodiment.

Referring to FIG. 9, furthermore, the color filter substrate 12 may further include a spacer 124 arranged on the planarization layer 123, the spacer 124 is at a corresponding display region 21 between the array substrate 11 and the planarization layer 123, the sealant 22 is at a periphery of the corresponding display region 21 between the array substrate 11 and the planarization layer 123, i.e., the bezel region 24, the first light shielding region 41 and the second light shielding region 42 on the sealant 22 may both be arranged in the above black matrix. Optionally, the insulating layer 30 may be made of a material identical to the spacer 124. Therefore, when forming the display motherboard 10, the first light shielding region 41 and the second light shielding region 42 may be formed simultaneously with the black matrix, and the insulating layer 30 may be formed simultaneously with the spacer 124. Optionally, the spacer 124 may be a columnar spacer.

In FIG. 7 to FIG. 9, only the first light shielding region 41 is shown. Actually, the second light shielding region 42 and the first light shielding region 41 may be arranged in an identical manner.

Referring to FIG. 4, the array substrate 11 includes a base substrate and a thin film transistor (called TFT for short) 111 arranged on the base substrate. In conjunction with the display motherboard 10 in at least one embodiment of the present disclosure, the sealant 22 is between the TFT layer 111 and the inner surface of the color filter substrate 12.

In the display motherboard provided by the present disclosure in at least one embodiment, adjacent two display panels in an identical row share the sealant at the first common region. In addition, in the first common region, a first light shielding region is arranged at a side of the first common region adjacent to one display region, a second light shielding region of the light shielding regions is arranged at a side of the first common region adjacent to the other display region, and an insulating layer is further arranged between the first light shielding region of the light shielding regions and the second light shielding region of the light shielding regions. In this way, when cutting the display motherboard, firstly the insulating layer is etched to form a gap between the first light shielding region and the second light shielding region, and the display motherboard is cut at a position corresponding to the gap in the display motherboard, and then the display motherboard may easily be segmented at the gap along a direction perpendicular to the display motherboard by gently pressing the display motherboard, finally a plurality of display panels are formed. In the formed display panels, every two adjacent display panels share the sealant at a common region, therefore the formed display panels may have narrow bezel.

Referring to FIG. 10 to FIG. 13, the present disclosure provides in at least one embodiment a method of cutting a display motherboard, the method of cutting the display motherboard is applied to the display motherboard 10 in at least one embodiment of the present disclosure, the cutting method includes:

Step S1: etching the insulating layer 30 in the display motherboard 10 by an etching process to remove the insulating layer 30 and form a gap 31 between the first light shielding region 41 and the second light shielding region 42;

Step S2: cutting the display motherboard 10 at a position corresponding to the gap 31 on the display motherboard 10.

According to the above cutting method, subsequent to step S1, a gap 31 may be formed between the first light shielding region 41 and the second light shielding region 42, and subsequent to step S2, the display motherboard 10 may be segmented at the gap 31 by gently pressing the display motherboard 10, so as to form the display panel 20 having a narrow bezel in at least one embodiment of the present disclosure.

Figure 10:
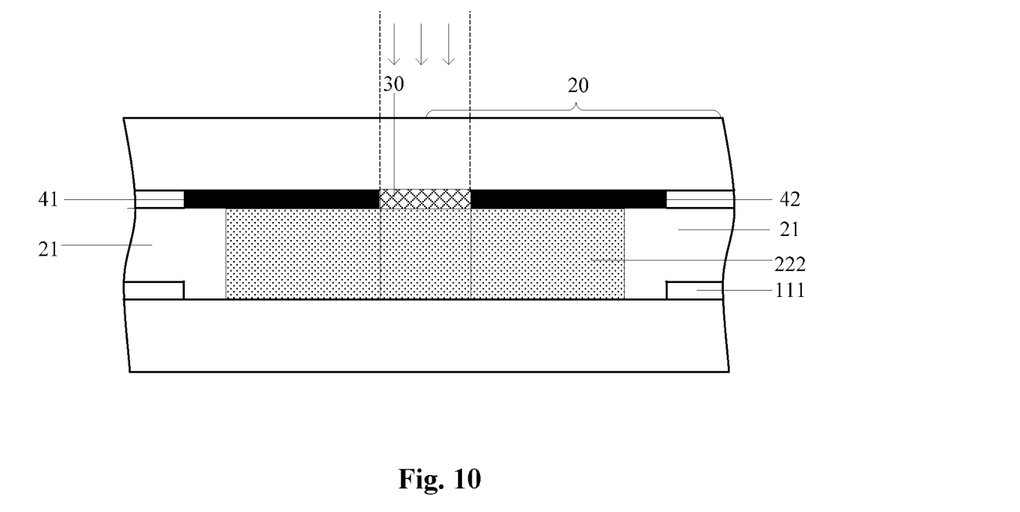
FIG. 10 to FIG. 13 are flowcharts showing a method of cutting a display motherboard provided by the present disclosure in at least one embodiment.

Referring to FIG. 10, the insulating layer 30 in step S1 may be an insulating layer 30 on the first common region 222. Optionally, the formed gap 31 has a certain depth and width, such that the display motherboard 10 may be segmented at the gap 31. In FIG. 10, a portion between two dotted lines is a range to be etched.

Figure 11:
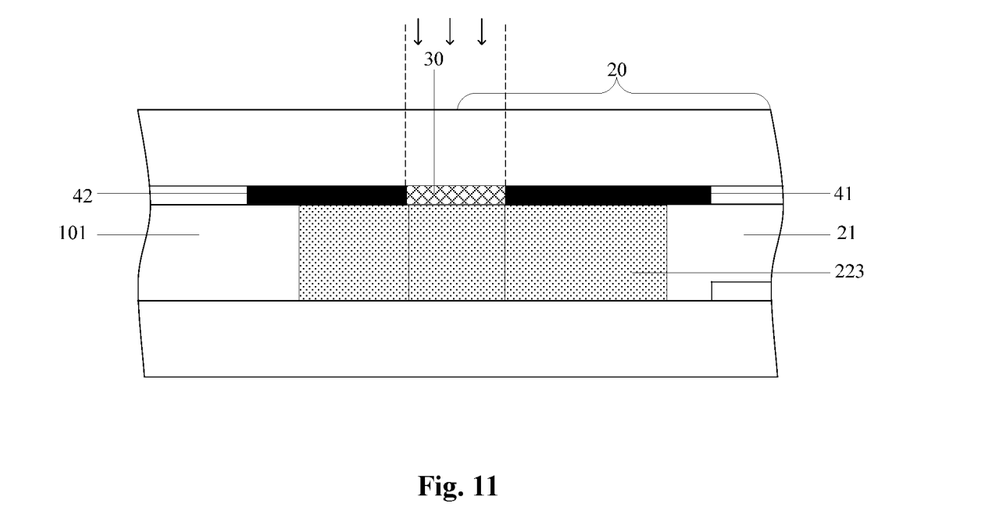

Referring to FIG. 11, the insulating layer 30 in the step S1 may also be an insulating layer 30 on the first edge portion 223. In FIG. 11, a portion between two dotted lines is a range to be etched.

Obviously, the insulating layer 30 in step S1 may also be an insulating layer 30 on the second common region 224.

Figure 12:
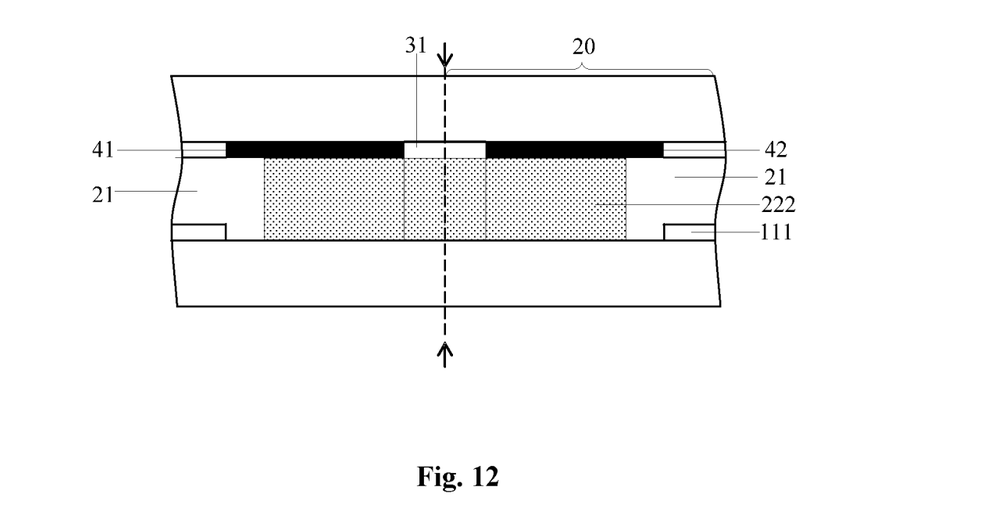
Figure 13:
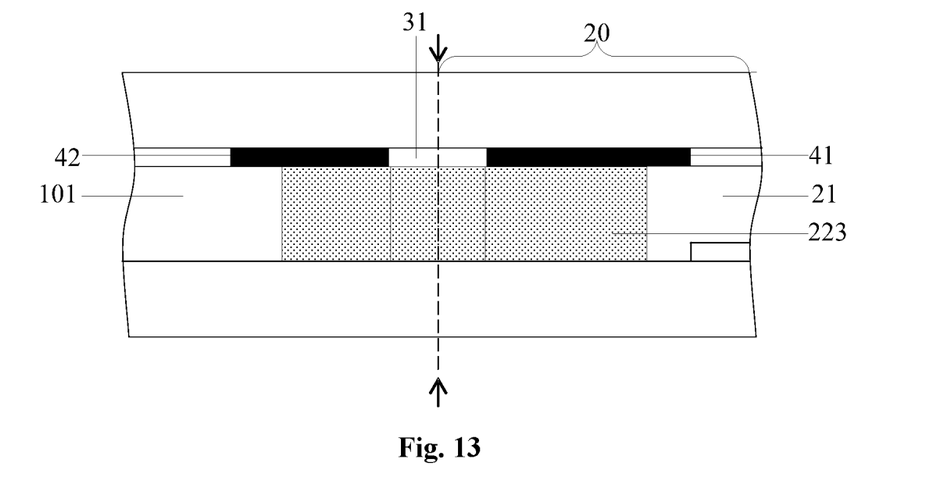

Referring to FIG. 12 and FIG. 13, in step S2, the display motherboard 10 may be cut at a position corresponding to the gap 31 on one surface of the display motherboard 10, and then the display motherboard 10 may be cut at the position corresponding to the gap 31 on the other surface of the display motherboard 10, thus the display motherboard 10 is segmented at the gap 31 along a direction perpendicular to the display motherboard 10 by gently pressing the display motherboard 10. In both FIG. 12 and FIG. 13, an arrowhead shows a cutting direction.

In order to make the display motherboard 10 evenly segmented at the gap 31 when gently pressing the display motherboard 10, bezels corresponding to two display panels 20 respectively are identical, and the display motherboard 10 may be cut along a center line of the insulating layer 30, here a cutting path for cutting the display motherboard 10 is a cutting line 50 (referring to FIG. 3 and FIG. 6). Optionally, a distance t1 between the cutting line 50 and the first light shielding region 41 is identical to a distance t2 between the cutting line 50 and the second light shielding region 42, where a sum of t1 and t2 is a width of the gap 31.

Optionally, the etching process adopted in step S1 may be a laser etching process. In both FIG. 10 and FIG. 11, arrowheads indicate laser beams.

Furthermore, in step S2, a conventional mechanical cutter wheel may be used to cut display motherboard 10.

It can be seen that, cutting at the sealant 22 directly by the mechanical cutter wheel will cause jumping of the cutter or damaging to the edge of the display panel 20 and generating burrs at the edge of the display panel 20, thus decreasing a quality of the display panel 20. According to the cutting method in at least one embodiment of the present disclosure, the display motherboard 10 is cut by a combination of the laser and the mechanical cutter wheel to effectively avoid phenomena that arise when cutting at sealant 22 directly by the mechanical cutter wheel, thus ensuring a high quality of the display panel 20.

It should be noted that, the display device provided by the present disclosure in at least one embodiment may be of a liquid crystal type, an organic light-emitting diode (OLED) type or an electronic paper type, and is applied to products or components having a display function, such as a mobile phone, a tablet PC, a TV, a display, a notebook computer, a digital photo frame, a navigator.

The above are merely some embodiments of the present disclosure and shall not be used to limit the scope of the present disclosure. A person skilled in the art may easily think modifications and replacements without departing from the scope disclosed by the present disclosure, and these modifications and replacements shall also fall within the scope of the present disclosure. Therefore, the scope of the present disclosure should be subject to the scope of what is claimed.

What is claimed is:

1. A display motherboard, wherein the display motherboard comprises a plurality of display panels, each of the display panels comprises a display region and a sealant arranged at a periphery of the display region, adjacent two display panels in an identical row share the sealant at a first common region, the first common region comprises a light shielding region and an insulating layer, the light shielding region comprises a first light shielding region and a second light shielding region, the first light shielding region is at a side of the first common region adjacent to the display region of one of the adjacent two display panels in the identical row, the second light shielding region is at a side of the first common region adjacent to the display region of the other one of the adjacent two display panels in the identical row, and the insulating layer is between the first light shielding region and the second light shielding region and made of an electrical insulating material;

wherein a lower surface of the insulating layer adjacent to the first common region is on a same plane with a lower surface of the light shielding region adjacent to the first common region.

2. The display motherboard according to claim 1, wherein a portion of the sealant close to an edge region of the display motherboard is a first edge portion, the first edge portion comprises the first light shielding region, the second light shielding region and the insulating layer, the first light shielding region is at a side of the first edge portion adjacent to the display region, the second light shielding region is at a side of the first edge portion adjacent to the edge region of the display motherboard, and the insulating layer is between the first light shielding region and the second light shielding region.

3. The display motherboard according to claim 2, wherein each display panel further comprises an electrode terminal region corresponding to the display region, the electrode terminal region is at a side of the sealant away from the display region, and the electrode terminal region and the first common region are perpendicular to each other; and the electrode terminal regions of the display panels in an identical row are at an identical side of the respective display regions of the display panels, and the electrode terminal regions of the display panels in an identical column are at an identical side of the respective display regions of the display panels.

4. The display motherboard according to claim 2, wherein each display panel further comprises an electrode terminal region corresponding to the display region, the electrode terminal region is at a side of the sealant away from the display region, and the electrode terminal region and the first common region are perpendicular to each other;

the electrode terminal regions of the display panels in an identical row are located at an identical side of the respective display regions, the electrode terminal regions of adjacent two display panels in an identical column are at opposite sides of the respective display regions; and the adjacent two display panels in the identical share the sealant at a second common region, the second common region comprises the first light shielding region, the second light shielding region and the insulating layer, the first light shielding region is at a side of the second common region adjacent to the display region of one of the adjacent two display panels in the identical column, the second light shielding region is at a side of the second common region adjacent to the display region of the other one of the adjacent two display panels in the identical row, and the insulating layer is between the first light shielding region and the second light shielding region.

5. The display motherboard according to claim 2, further comprising an array substrate and a color filter substrate opposite to the array substrate, the sealant is between the array substrate and the color filter substrate, and the light shielding region and the insulating layer are in the color filter substrate.

6. The display motherboard according to claim 1, wherein each display panel further comprises an electrode terminal region corresponding to the display region, the electrode terminal region is at a side of the sealant away from the display region, and the electrode terminal region and the first common region are perpendicular to each other; and the electrode terminal regions of the display panels in an identical row are at an identical side of the respective display regions of the display panels, and the electrode terminal regions of the display panels in an identical column are at an identical side of the respective display regions of the display panels.

7. The display motherboard according to claim 1, wherein each display panel further comprises an electrode terminal region corresponding to the display region, the electrode terminal region is at a side of the sealant away from the display region, and the electrode terminal region and the first common region are perpendicular to each other;

the electrode terminal regions of the display panels in an identical row are at an identical side of the respective display regions, and the electrode terminal regions of adjacent two display panels in an identical column are at opposite sides of the respective display regions; and the adjacent two display panels in the identical column share the sealant at a second common region, the second common region comprises the first light shielding region, the second light shielding region and the insulating layer, the first light shielding region is at a side of the second common region adjacent to the display region of one of the adjacent two display panels in the identical column, the second light shielding region is at a side of the second common region adjacent to the display region of the other one of the adjacent two display panels in the identical row, and the insulating layer is between the first light shielding region and the second light shielding region.

8. The display motherboard according to claim 1, further comprising an array substrate and a color filter substrate opposite to the array substrate, wherein the sealant is between the array substrate and the color filter substrate, and the light shielding region and the insulating layer are in the color filter substrate.

9. The display motherboard according to claim 8, wherein the color filter substrate comprises a base substrate and a black matrix, a color filter layer, a planarization layer and a spacer successively arranged on the base substrate, and the sealant is between the array substrate and the color filter substrate;

the color filter layer comprises a red color filter resin, a green color filter resin and a blue color filter resin, and the insulating layer is any one of the black matrix, the red color filter resin, the green color filter resin, the blue color filter resin, the planarization layer and the spacer; and the light shielding region is a part of the black matrix.

10. The display motherboard according to claim 8, wherein an orthographic projection of the insulating layer onto the array substrate is completely within an orthographic projection of the first common region onto the array substrate.

11. A method of cutting the display motherboard according to claim 1, the method comprising:
etching the insulating layer by an etching process to remove the insulating layer and form a gap between the first light shielding region and the second light shielding region; and
cutting the display motherboard at a position corresponding to the gap on the display motherboard.

12. The method according to claim 11, wherein the display motherboard is cut along a cutting line, and a distance between the cutting line and the first light shielding region is identical to a distance between the cutting line and the second light shielding region.

13. The method according to claim 11, wherein the etching process is a laser etching process.

14. The method according to claim 11, wherein the cutting the display motherboard at a position corresponding to the gap on the display motherboard comprises:
cutting the display motherboard by a mechanical cutter wheel.

15. The display motherboard according to claim 1, wherein the sealant at the first common region is singular homogeneous.

16. The display motherboard according to claim 1, wherein a light shielding member of the light shielding region is in direct physical contact with the sealant at the first common region.

* * * * *